United States Patent
Rieger

(10) Patent No.: US 6,397,889 B1
(45) Date of Patent: Jun. 4, 2002

(54) METHOD FOR MOUNTING A ROTARY VALVE FOR POWER ASSISTED STEERING SYSTEMS, ESPECIALLY FOR MOTOR VEHICLES

(75) Inventor: Wolfgang Rieger, Donzdorf (DE)

(73) Assignee: ZF Lenksysteme GmbH, Schwabisch Gmund (DE)

(*) Notice: Subject to any disclaimer, the term of this patent is extended or adjusted under 35 U.S.C. 154(b) by 0 days.

(21) Appl. No.: 09/856,235

(22) PCT Filed: Nov. 13, 1999

(86) PCT No.: PCT/EP99/08762

§ 371 (c)(1),
(2), (4) Date: May 18, 2001

(87) PCT Pub. No.: WO00/29272

PCT Pub. Date: May 25, 2000

(30) Foreign Application Priority Data

Nov. 18, 1998 (DE) .......................................... 198 53 142

(51) Int. Cl.[7] .............................................. B62D 5/083
(52) U.S. Cl. ............................. 137/625.21; 137/625.24; 91/375 A
(58) Field of Search ....................... 137/625.21, 625.24, 137/625.23; 91/375 A, 375 R

(56) References Cited

U.S. PATENT DOCUMENTS

| | | | |
|---|---|---|---|
| 3,867,075 A | * 2/1975 | Horst ................ | 137/625.17 X |
| 4,106,883 A | * 8/1978 | Hansen et al. ...... | 137/625.24 X |
| 4,561,516 A | * 12/1985 | Bishop et al. ........ | 91/375 A X |
| 4,823,839 A | 4/1989 | Rayner | |
| 4,858,712 A | * 8/1989 | Neff ..................... | 91/375 A X |
| 5,109,753 A | * 5/1992 | Kobayashi ............. | 91/375 A |
| 5,178,189 A | 1/1993 | Mitoya | |
| 5,230,273 A | * 7/1993 | Fraley, Jr. ............ | 91/375 A X |
| 5,311,906 A | * 5/1994 | Phillips ................ | 137/625.23 |
| 5,316,043 A | * 5/1994 | Phillips ................ | 137/625.23 |
| 5,727,443 A | * 3/1998 | Baxter et al. ........... | 91/375 A |

FOREIGN PATENT DOCUMENTS

| | | |
|---|---|---|
| DE | 39 30 541 | 3/1990 |
| DE | 42 21 741 | 2/1993 |
| DE | 44 20 744 | 7/1997 |
| EP | 0 773 156 | 5/1997 |

* cited by examiner

Primary Examiner—Michael Powell Buiz
Assistant Examiner—Meredith H Schoenfeld
(74) Attorney, Agent, or Firm—Kenyon & Kenyon

(57) ABSTRACT

A method for assembling a rotary valve for hydraulic power assisted steering systems may be used for a rotary valve having the following features: both valve elements of the rotary valve have longitudinal control grooves, interacting control edges of the longitudinal control grooves of the control bushing and of the rotary slide being formed parallel to each other and converging in an oblique manner at the same angle in relation to the longitudinal axis of the rotary valve. The method includes the following steps: the rotary slide is pushed into the control bushing up to a point just ahead of a stop in the region of the valve output member. The two valve elements of the rotary valve are aligned in their central position and are clamped there in a manner secure against rotation in relation to a torsion bar spring. In order to determine the profile of a basic characteristic curve, the rotary valve is deflected fully in both directions and the pressure/angle or the pressure/torque ratio is recorded. The basic characteristic curve is compared with a desired nominal characteristic curve from a predetermined family of nominal characteristic curves (valve characteristic curves). The axial position of the rotary slide is adjusted until the desired nominal characteristic curve has been achieved at least at a predetermined point. The rotary slide is then connected definitively to the torsion bar spring in a manner secure against relative rotation.

2 Claims, 1 Drawing Sheet

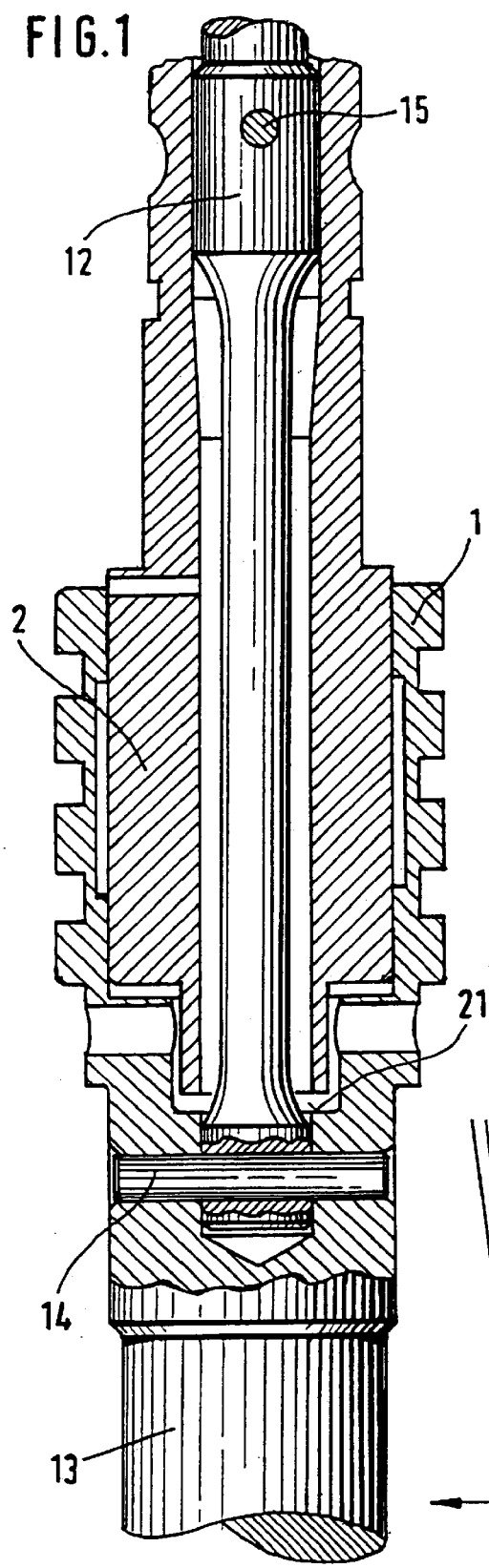
FIG.1
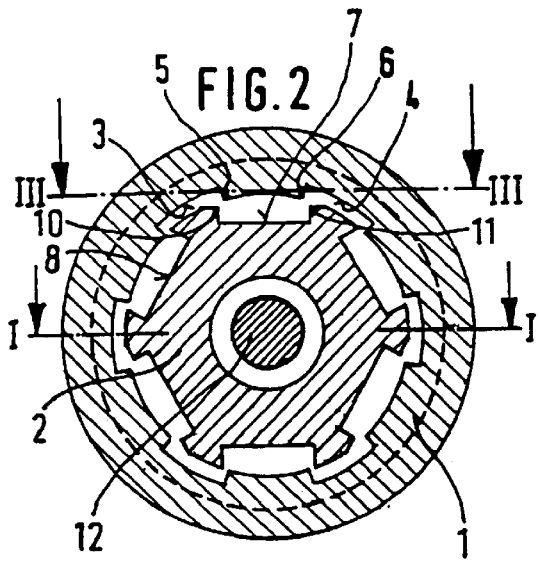
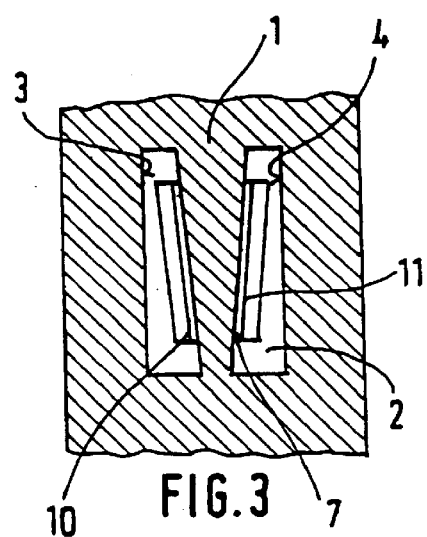
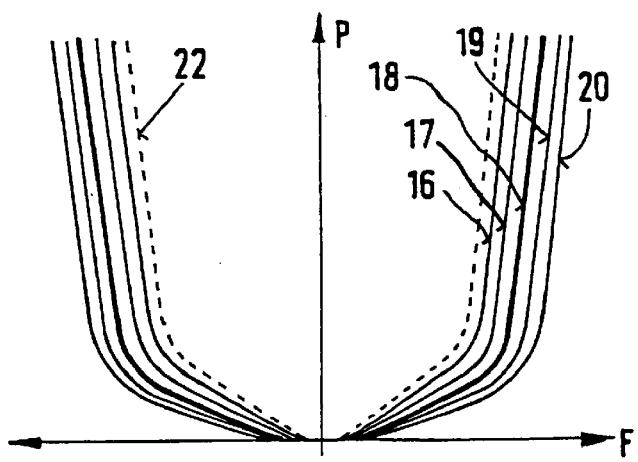

METHOD FOR MOUNTING A ROTARY VALVE FOR POWER ASSISTED STEERING SYSTEMS, ESPECIALLY FOR MOTOR VEHICLES

FIELD OF THE INVENTION

The present invention relates to a method for assembling a rotary valve for hydraulic power assisted steering systems, especially for motor vehicles. The rotary valve includes a first valve element in the form of a rotary slide and a second valve element in the form of a control bushing, which can be rotated relative to one another. The control bushing and the rotary slide have longitudinal control grooves that interact with one another to direct a pressure medium from a source of pressure medium to a servomotor. Interacting control edges of the longitudinal control grooves of the control bushing and the rotary slide are formed parallel to one another. The control edges at least of the longitudinal control grooves of the rotary slide, which are connected to the source of pressure medium, and the control edges of the control bushing, which interact with the same, are formed so that they converge in an oblique manner at the same angle in relation to the longitudinal axis of the rotary valve.

BACKGROUND INFORMATION

A conventional method for assembling a rotary valve for hydraulic power assisted steering systems includes the following steps:

the rotary slide is inserted into the control bushing, which is connected firmly in terms of rotation to a valve output member, and displaced inwardly to a point just ahead of a stop in the region of the valve output member, the two valve elements of the rotary valve are aligned in their central position with the aid of a pressure medium and are clamped in this position in a manner secure against rotation in relation to a torsion bar spring, in order to determine the profile of a characteristic curve, the rotary valve is deflected fully in both directions and the pressure/angle or the pressure/torque ratio is recorded.

A method of this kind is used in assembling a rotary valve as described in European Published Patent Application No. 0 440 665, for example. The intention with this rotary valve is to reduce the width of the tolerance zone of the valve characteristic curves to a minimum.

It is an object of the present invention to provide an improved method for assembling a rotary valve so that different valve characteristic curves may be produced exactly with the same rotary valve components.

SUMMARY

The above and other beneficial objects of the present invention are achieved by providing a method as described herein. This method allows the steering and handling of a vehicle to be modified without the need for different valve components. The solution is achieved by virtue of the fact that the basic characteristic curve determined is compared with a desired nominal characteristic curve from a predetermined family of nominal characteristic curves stored in software in an assembly device. The axial position of the rotary slide is adjusted until the desired nominal characteristic curve of the rotary valve has been achieved at least at a predetermined point. The rotary slide is then connected definitively to the torsion bar spring in a manner secure against relative rotation.

The different profiles of the valve characteristic curves represent approximately a parallel family of curves within the desired range. It is therefore necessary to select a point on the characteristic curve that is significant for the steering and handling of each type of vehicle. For this purpose, the desired servo pressure (or, alternatively, for the adjustment process, the valve deflection angle associated with this pressure) and the matching steering torque are determined for this point by driving tests.

A device provided for adjusting the valve characteristic in the steering valve should be capable of selecting any point (defined by the servo pressure and the associated steering torque) on the characteristic curve that has been determined in the driving tests and of permanently fixing the valve components, the rotary slide and the control bushing, relative to one another at this point (e.g., by drilling and pinning relative to one another).

To achieve this, it is necessary to control the characteristic-adjusting process by coordinate data (pressure/torque) using programmable software in order to produce a multiplicity of different characteristic curves that can be produced with pinpoint accuracy, i.e., without tolerances, in the most important range for assessment of handling, with identical standard valve components.

By virtue of this concept, it is possible to produce valve-characteristic profiles within a range of any desired size, even if the number of different valve components is reduced. This means a significant cost saving. An additional advantage is that this principle may be employed in the case of certain component features to make manufacturing processes that were previously expensive owing to close tolerances less sophisticated without having to accept wider tolerances in the characteristic curves.

Such a possibility is particularly advantageous in the case of passenger cars based on the common platform concept. It is possible to provide the different vehicles mounted on such a platform with steering characteristic curves that are "tailor-made" for them. This is possible with absolutely identical valve components stemming from a single basic steering system for this platform.

BRIEF DESCRIPTION OF THE DRAWINGS

FIG. 1 is a longitudinal cross-sectional view taken along the line I—I in FIG. 2 through a rotary valve that may be assembled in accordance with the method according to the present invention.

FIG. 2 is a cross-sectional view through the rotary valve illustrated in FIG. 1.

FIG. 3 is a partial longitudinal cross-sectional view along the line III—III in FIG. 2.

FIG. 4 illustrates a family of valve characteristic curves for different depths of installation of the rotary slide and the control bushing.

DETAILED DESCRIPTION

The rotary valve that may be assembled in accordance with the method according to the present invention includes a first valve element in the form of a control bushing 1, in which a second valve element in the form of a rotary slide 2 is guided in a rotatable manner. On the inside, the control bushing 1 includes longitudinal control grooves 3 and 4, which are provided with control edges 5 and 6. The longitudinal control grooves 3 and 4 are connected to the two pressure chambers of a servomotor (not shown).

The rotary slide 2 includes longitudinal control grooves 7 and 8, which are connected to a servo pump (not shown) or a reservoir (not shown). The longitudinal control grooves 7 are provided with control edges 10 and 11 that interact with control edges 5 and 6. Control edges 10 and 11 are provided in a conventional manner with control chamfers, by which it is possible to achieve a specific shape of the valve characteristic curve of the rotary valve.

The control edges 5 and 6 of the longitudinal control grooves 3 and 4 of the control bushing 1 taper toward one another. The control edges 10 and 11 of the longitudinal control groove 7 of the rotary slide 2 likewise taper toward one another. Control edge 5 of the control bushing 1 and control edge 10 of the rotary slide 2 are formed parallel to one another. Control edge 6 of the control bushing 1 is likewise formed parallel to control edge 11 of the rotary slide 2. This means that the control edges 10, 11 at least of the longitudinal control edges 7 of the rotary slide 2 that are connected to the source of pressure medium and the control edges 5, 6 of the control bushing 1 that interact with these are designed so as to converge in an oblique manner at the same angle in relation to the longitudinal axis of the rotary valve.

The longitudinal control grooves 3 and 4 of the control bushing 1 may be produced by a cold-forming method, which does not involve removal of metal. Examples of possible methods are cold extrusion and rotary swaging. The longitudinal control grooves 7 and 8 of the rotary slide 2 may be produced by a method that does not involve removal of metal. However, all of the longitudinal control grooves may be produced by a method involving the removal of metal.

The rotary slide 2 is centered in the control bushing 1 by a torsion bar 12. One end of the torsion bar 12 is connected in a rotationally fixed manner to a valve output member 13 and the other is connected in a rotationally fixed manner to the control bushing 1 and the rotary slide 2. The connection is made by pins 14 and 15, for example.

In FIG. 4, the working pressure p of a power assisted steering system is plotted in a diagram against the steering torque M at the steering wheel. Five different valve characteristic curves 16, 17, 18, 19 and 20 are illustrated, and their different significance will be explained below. The rotary valve is assembled by the following method:

The rotary slide 2 is inserted into the control bushing 1, which is connected firmly in terms of rotation to the valve output member 13, e.g., a pinion of a rack-type power assisted steering system or a steering worm of a ball-nut power assisted steering system, and pushed in until it is in the immediate vicinity of end contact with a stop 21 in the region of the valve output member 13. (To clarify the phrase "immediate vicinity", it may be stated that the rotary slide 2 must not rest against the stop 21 since otherwise the friction that this would cause would distort the adjustment process). The two valve elements, the control bushing 1 and the rotary slide 2, are aligned in their hydraulic central position with the aid of a liquid or gaseous pressure medium and are clamped in this position in a manner secure against rotation in relation to the torsion bar spring 12. To determine the profile of a basic characteristic curve 22, the rotary valve is deflected fully in both directions and the pressure/angle or the pressure/torque ratio is recorded.

The basic characteristic curve 22 is then compared with a desired nominal characteristic curve from a predetermined family of nominal characteristic curves (valve characteristic curves 16 to 20) stored in software in an assembly device. The axial position of the rotary slide 2 is adjusted until the desired nominal characteristic curve of the rotary valve has been achieved at least at a predetermined point. The rotary slide 2 is then connected definitively to the torsion bar spring 12 in a manner secure against relative rotation, e.g., by the pin 15, by being rolled into serrations or by some other permanent joint.

Different valve characteristic curves are obtained depending on the axial position of the rotary slide 2 relative to the control bushing 1: if the rotary slide 2 is only at a relatively short distance from the stop 21, a valve characteristic curve 16 is obtained. Valve characteristic curves 17 to 20 are obtained with increasing distance from the stop 21.

What is claimed is:

1. A method for assembling a rotary valve for a hydraulic power assisted steering system, the rotary valve including a first valve element in the form of a rotary slide and a second valve element in the form of a control bushing, the first valve element and the second valve element being relatively rotatable, the control bushing and the rotary slide including longitudinal control grooves configured to interact with each other to direct a pressure medium from a pressure medium source to a servomotor, the longitudinal control grooves of the control bushing and rotary slide including parallel interacting control edges, the control edges of the longitudinal control grooves of the rotary slide being connected to the pressure medium source, the control edges of the longitudinal control grooves of the rotary slide and the control edges of the control bushing being formed so as to obliquely converge at a same angle relative to a longitudinal axis of the rotary valve, the method comprising the steps of:

inserting the rotary slide into the control bushing, the control bushing being connected non-rotatably to a valve output member and displaced inwardly to a location ahead of a stop in a region of the valve output member;

aligning the first valve element and the second valve element in a hydraulic central position in accordance with the pressure medium;

clamping the aligned first valve element and the second valve element against rotation relative to a torsion bar spring;

determining a profile of a basic characteristic curve, the determining step including the substeps of:
deflecting the rotary valve fully in opposite directions; and
recording one of a pressure-angle ratio and a pressure-torque ratio;

comparing the determined basic characteristic curve with a desired nominal characteristic curve from a predetermined family of nominal characteristic curves stored in software;

adjusting an axial position of the rotary slide until the desired nominal characteristic curve of the rotary valve is achieved at least at a predetermined point; and connecting the rotary slide and the torsion bar spring relatively non-rotatably.

2. The method according to claim 1, wherein the hydraulic power assisted steering system is configured for use in a motor vehicle.

* * * * *